United States Patent
Gougelet et al.

(10) Patent No.: US 9,261,604 B2
(45) Date of Patent: Feb. 16, 2016

(54) RADIATION EXPOSURE SELF TEST (REST)—OPTIMIZED PERSONAL DOSIMETRY AND KIOSK FOR RELIABLY INDICATING EXPOSURE TO RADIATION

(71) Applicants: Robert M. Gougelet, Hanover, NH (US); James Robert White, San Mateo, CA (US)

(72) Inventors: Robert M. Gougelet, Hanover, NH (US); James Robert White, San Mateo, CA (US)

(73) Assignee: Gray Rapid Diagnosis, LLC, Hanover, NH (US)

( * ) Notice: Subject to any disclaimer, the term of this patent is extended or adjusted under 35 U.S.C. 154(b) by 0 days.

(21) Appl. No.: 14/488,145

(22) Filed: Sep. 16, 2014

(65) Prior Publication Data
US 2015/0076356 A1  Mar. 19, 2015

Related U.S. Application Data

(60) Provisional application No. 61/878,332, filed on Sep. 16, 2013.

(51) Int. Cl.
*G01T 1/02* (2006.01)

(52) U.S. Cl.
CPC .. *G01T 1/02* (2013.01); *G01T 1/026* (2013.01)

(58) Field of Classification Search
CPC .................................. G01T 1/02; G01T 1/026
USPC .................. 250/370.07, 336.1, 395
See application file for complete search history.

(56) References Cited

U.S. PATENT DOCUMENTS

| 7,420,187 B1* | 9/2008 | Klemic .................. G01T 1/10 250/484.5 |
| 2008/0023647 A1 | 1/2008 | Patel et al. |
| 2009/0108212 A1 | 4/2009 | Gordon et al. |
| 2012/0037807 A1* | 2/2012 | Ujhazy .................. G01T 1/023 250/362 |
| 2012/0235062 A1 | 9/2012 | Patel et al. |

FOREIGN PATENT DOCUMENTS

JP  2002-286845  10/2002

OTHER PUBLICATIONS

PCT International Search Report and the Written Opinion of the International Searching Authority for PCT/US2014/055940; Date of mailing Dec. 26, 2014.
W. Koch, "Account describes WWII 'wasteland'," USA Today, p. 9A, Jun. 23, 2005

(Continued)

*Primary Examiner* — David Porta
*Assistant Examiner* — Meenaksi Sahu
(74) *Attorney, Agent, or Firm* — Tope-McKay & Associates

(57) ABSTRACT

Described is a method and system that facilitates triage of thousands to millions of potential patients within a relatively short period of time by scanning of a substrate of a designated card issued to a victim. The method and the system comprise a plurality of noninvasive self-testing test devices located at a plurality of remote peripheral self-testing sites, and each one of the plurality of noninvasive self-testing test devices facilitates self-testing of the substrate of the designated card. Each of the plurality of noninvasive self-testing test devices provides test results of the scan of the substrate of the designated card, and the potential patients are identified, then subsequently screened and triaged based upon the test results of the scan of the substrate of the designated card.

21 Claims, 11 Drawing Sheets

(56) References Cited

OTHER PUBLICATIONS

H. Swartz "Long-lived electron spin resonances in rats irradiated at room temperature," Radiat. Res., No. 24, pp. 579-586, 1965.

M. Desrosiers and D. Scauer, "Electron paramagnetic resonance (EPR) biodosimetry," Nucl. Inst. Met in Phys, Res., vol. 5, No. 184, pp. 219-228, 20010.

S. Breen and J. Battista, "Radiation dosimetry in human bone using election paramgrietic resonance," Phys. Med. Biol., No. 40, pp. 2065-2077, 1995.

A. Trivedi and C. Greenstock, "Use of sugars and hair for ESR emergency dosimetry," Appl. Radiat Isot., No. 44, pp. 85-90, 1993.

Strzelczak, Grazyna, et al., "EPR study of y-irradiated feather keratin and human fingernails concerning retrospective dose assessment" Nukleonika, 2013; 58(4):505-509.

Wilcox, DE, He X., Gui, J., Rouge, AE, Li, H., Williams, BB., Swartz, HM, "Dosimetry based on EPR spectral analysis of fingernail clippings" Health Phys, Feb. 2010; 98(2): 309-17.

Trompier, F., Bassinet, C., Wieser, A., DeAngelis, C., Viscomi, D., Fattibene, P., "Radiation-induced signals analysed by EPR spectrometry applied to fortuitous dosimetry" Ann 1st Super Sanita, 2009, 45(3): 267-296.

Trompier, F., Bassinet, C., Della Monaca, S., Romanyukha A. Reyes, R., Clairand, l., "Overview of physical and biophysical techniques for accident dosimetry" Radiat Prot Dosimetry, Mar. 2011; 144(1-4): 571-4.

Reyes, RA., Romanyukha, A., Trompier, F., Mitchell, CA., Clairand, I., et al, "Electron paramagnetic resonance in human fingernails: the sponge model implication" Radiat Environ Biophys, Nov. 2008; 47(4): 515-26.

Black, PJ., SG., "Ex vivo analysis of irradiated fingernails: chemical yields and properties of radiation-induced and mechanically-induced radiacals" Health Phys, Feb. 2010, 98(2): 301-8.

Swartz, H., et. al. "Electron paramagnetic resonance dosimetry fro a large-scale radiation incident" Health Phys, Sep. 2012; 103(3): 255-67.

Swartz, H., et al., "In vivo EPR dosimetry to quantify exposure to clinically significant doses of ionising radiation" Radiat Prot Dosimetry, 2006; 120(1-4): 163-70.

Sealy, R.C., et al., "Novel free radicals in synthetic and natuaral pheomelanins: distiction between dopa melanins and cysteinyldope melanins by ESR spectroscopy" Proceedings of the the National Academy of Sciences, Jun. 1982; 79(9): 2885-9.

Sealy, R.C., et al., "Eumelanins and pheomelanins: characterization by electron spin resonance spectroscopy" Science, Sep. 1982; 217(4559): 545-7.

Egawa, M., Fukuhara, T., Takahashi, M., Ozaki, Y., "Determining water content in human nails with a portable near infra red spectrometer" Appl Spectrosc, Apr. 2003, 57(4): 473-8.

Swartz, H.M., Flood, Ann B., Gougelet Robert M., et al., "A critical assessment of biodosimetry methods for large-scale incidents" Health Phys., Feb. 2010; 98(2): 95-108.

Suzuki, H., et al., "Development of a compact electron spin resonance system for measuring ESR signals of irradiated fingernails", Heath Phys. Feb. 2010; 98(2): 318-21.

Gougelet, Robert M., et al., "The view from the trenches: part 1—emergency medical response plans, and the need for EPR screening", Health Phys., Feb. 2010; 98(2): 118-127.

Nicolade, Roberto J., Gougelet, Robert M., et al., "The view from the trenches: part 2—technical considerations for EPR screening" Feb. 2010; 98(2): 128-135.

A. Bouville, M. Linet, M. Hatch, K. Mabuchi, and S. Simon, "Guidelines for Exposure Assessment in Health Risk Studies Following a Nuclear Reactor Accident," Environmental Health Perspectives, vol. 122, No. 1, Jan. 2014, pp. 1-5.

Ahmed M. Maghraby (2012). Ionizing Radiation Induced Radicals, Current Topics in Ionizing Radiation Research, Dr. Mitsuru Nenoi (Ed.), ISBN: 978-953-51-0196-3, InTech, Available from: http://www.intechopen.com/books/current-topics-in-ionizing-radiation-research/ionizing-radiation-inducedradicals.

Mamedov, etal, "The ESR signals in silk fibroin and wool keratin under both the effect of UV-irradiation and without any external effects and the formation of free radicals," Biomaterials, 2002; 23. pp. 3405-3412.

J. Moulder and M. Medhora, "Advances in Mitigation of Injuries from Rodiological Terrorism or Nuclear Accidents," Defense Science Journal, vol. 61, No. 2, Mar. 2011, pp. 99-104.

S. Rana, R. Kumar, S. Sultana, and RK Sharma, "Radiation-induced biomarkers for the detection and assessment of absorbed radiation doses," J. Pharm. Bioallied Sci., 2010; 2(3), pp. 189-196.

A. Romanyukha and F. Trompier, "Electron Paramagnetic Resonance Retrospective Dosimetry," Concepts and Trends in Medical Radiation Dosimetry, AIP Conf. Proc. 1345, (2011), pp. 120-128; doi: 10.1063/1.3576162.

A. Romanyukha, V. Nagy, O. Sleptchonok, M. Desroiers, J. Jiang, and A. Heiss, "Individual Biodosimetry at the Natural Radiation Background Level," Health Physics, 2000; 80(1), pp. 71-13.

J. Tyburski et al, "Radiation Metabolomics 1. Identification of Minimally Invasive Urine Biomarkers for Gamma-Radiation Exposure in Mice," Radiation Research, 2008; 170, pp. 1-14.

F. Trompier, A. Romanyukha, R. Reys, H. Vezin, F. Queinnec, and D. Gourier, "State of the art in nail dosimetry: free radicals identification and reaction mechanisms," Radiat. Environ. Biophys., 2014; 53, pp. 291-303.

R. Nicolalde, et al, "A Decision Tool for Evaluation the Effectiveness and Logistical Consideration of Biodosimetry Methods," IEEE (2012), 978-1-4673-2709-1, pp. 18-23.

M Rea, R. Gougelet, R. Nicolalde, J. Geiling, and R. Swatz, "Proposed Triage Categories for Large-Scale Radiation Incidents Using High-Accuracy Biodosimetry Methods," Health Physics, 2010; 98(2), pp. 136-144.

* cited by examiner

RADIATION EXPOSURE SELF TEST (REST)—OPTIMIZED PERSONAL DOSIMETRY AND KIOSK FOR RELIABLY INDICATING EXPOSURE TO RADIATION

CROSS-REFERENCE TO RELATED APPLICATIONS

This is a non-provisional patent application of U.S. Provisional Application No. 61/878,332, filed on Sep. 16, 2013.

BACKGROUND OF THE INVENTION (1) Field of the Invention

The present invention relates to a radiation exposure test and, more particularly, to a system and a method for a radiation exposure self-test (REST) that provides a near real-time, rapid and accurate indication of radiation exposure.

(2) Description of Related Prior Art

Billions of dollars are spent in the development of medical and nonmedical countermeasures that are directed at counteracting the consequences of an intentional attack by an improvised nuclear device. As is well known in the art, when a victim/patient is exposed to ionizing radiation, such as that emitted as a result of the intentional detonation of a nuclear device, it is highly advantageous to administer medical countermeasures and/or medical treatment as close to the time of exposure as possible. That is, it is generally acceptable and advisable to administer such medical countermeasures and/or medical treatment to counteract exposure to radiation within 24 hours so as to increase the probability that such medical countermeasures and/or medical treatment will decrease morbidity and mortality of potential patients. Personal dosimetry is of particular importance as direct in-vivo or direct physiological indicators, at present time, with current technology measure delayed manifestations such as chromosomal aberrations and white blood cell counts. In fact, even people who will eventually die from ARI in the hours and days after exposure will be asymptomatic and without significant physical complaints in the first few days after exposure, thereby missing the time frame when medical counter measures (MCM) would be most effective.

It is contemplated that detonation of an improvised nuclear device, within an urban area, could easily impact over 1 million potential patients as cited in the DHS planning scenarios. It is to be appreciated that up to ten or more times that number of victims may actually show up for testing. Such detonation would result in immediate deaths due to traumatic injuries, burns and acute radiation illness. Widespread destruction could lead to panic and civil unrest. Radioactive contamination and continued exposure, through ingestion and inhalation of radioactive particles, would present ongoing medical and environmental issues. There also could be a significant loss of critical infrastructure such as command and control, hospital and resource buildings, communications, power, and water due to immediate destruction, contamination and electromagnetic pulse damage, thereby limiting, or severely hindering at the very least, the ability of the local, state and federal authorities to provide necessary care for the potential patients in need of life-saving medical intervention and/or treatment.

It is further recognized that popular and urgent national research objectives to obtain in-vivo measurements in fingernails and teeth are fundamentally and significantly flawed. For example, in terms of obtaining accurate and timely measurements in the in-vivo environment and the sub-optimal nature of the matrices, it is highly unlikely that these systems will be utilized effectively in a true mass casualty incident, and the measurements obtained are not a direct measurement of physiological response, rather a measurement of sub-atomic changes occurring within inert materials within the body. This enormous effort to 'over build,' fueled by misguided perceptions, is truly a national crisis that is adding millions of dollars to the national budget and is causing delays in the development of a system that would potentially save countless lives in the event that a nuclear mass casualty incident were to occur.

A significant amount of the current effort underway is focused on developing technologies that take in-vivo measurements from, either a tooth or fingernails. In-vivo versus in-vitro testing is usually done to determine the clinical impact on a living organism bases on the actual response of the body or tissue, for example. In the case of in-vivo measurement of teeth or fingernail(s), there is no direct indication of clinical response of the body that could not be obtained from an external measurement of a driver's license, a credit card or some other measurable material carried in close proximity to the body of an individual. This distinction, by itself could save many billions of dollars in the final costs of implementing, development, building, deploying and eventual FDA approval thereby leading into a new area of measurement that would be more cost effective, faster, portable and provide the same information. A desired system will quickly identify potential patients in a non-invasive manner in a much shorter period of time.

In public health, the term "herd immunity" is used to describe a large enough group that has become immune—usually through vaccination—so that the few members that are not vaccinated have an extremely unlikely chance that they will ever come in contact with an infected member, therefore, halting the spread of an infectious disease. With radiation exposure, the term "herd exposure" could be utilized. In this case, by measuring enough potential patients within a certain area, via a rapid self-test procedure, then at some point, a determination could be made that within this group, testing can be discontinued with confidence that no immediate medical care needs to be given or, at the other extreme, that more medical resources are required to be moved to a specific area based on the number of positive tests.

During the time of such a nuclear detonation or any other similar mass disaster, it is believed that there will be a significant need to accurately identify, screen, triage, and gather data from thousands, if not hundreds of thousands, or millions of potential patients over a very short period of time, optimally 24 hours.

Further, there may also be a need to identify, screen, then triage the entire population of citizens residing within a certain radius (e.g., a 2 mile radius, a 5 mile radius, a 10 mile radius, a 20 mile radius, etc., depending upon the size of the nuclear detonation and environmental conditions) of ground zero of the nuclear detonation in order to determine which potential patients require immediate medical attention and which potential patients, due to either limited, minimal or possibly no exposure to the radiation, may defer medical attention or receive the necessary support or preventative treatment within a few days or possibly a few weeks, for example, or may not require any medical countermeasures, medical treatment or any attention at all. Moreover, given that the population that may be affected by such a mass disaster could conceivably amount to 1 million or more potential patients, the current medical screening and triage processes are generally unacceptable and insufficient to handle such a large volume of potential patients within such a short duration of time, e.g., within 24 or 48 hours, for example, of the nuclear detonation or some other similar disaster.

A mean lethal dose of radiation, which typically kills 50% of human beings within sixty (60) days, is a whole-body radiation dose of typically between 3.25 to 4 Gy when, following exposure to such radiation, the victim/patient does not receive any medical care or treatment. However, if the victim/patient receives medical care and attention, such as myeloid cytokines, G_CSF, supportive care, antibiotics, anti-nausea medicines, bone marrow transplants, for example, following whole body exposure to radiation of a dose greater than about 2-3 Gy, then the patient has a higher probability of surviving such radiation exposure. The ability to rapidly self test individual patients within a very short period of time, i.e., 15 seconds per test per person would allow near real time allocation and distribution of resources to the patients most requiring urgent care. Further, depending on available resources, it is generally accepted that a whole-body dose of radiation of greater than 8-10 Gy is likely to be lethal to any victim/patient in a mass casualty setting.

Researchers are currently developing and testing equipment to measure dose levels in the tooth enamel and fingernails of potential patients of a radiological or a nuclear catastrophe, including a terrorist attack. At present, such test equipment is relatively large, bulky, sensitive to vibrations and temperature, difficult to operate, subject to in-vivo variations, and victim/patient movement. Each measuring device must be operated by specifically trained personnel, and typically requires a scan or data acquisition time of over 5-10 minutes. In addition, the additional time associated with removing the previous victim/patient, fitting new victim/patient, removing and putting on a new pair of gloves, gathering and adding disposables, readjusting tooth or fingernail placement, taking additional universal precautions against infectious disease and allowing additional time for patient movement and re-test if the patient moves significantly during the test procedure, could bring the total cycle time for each patient to typically between at least 10-15 minutes. Many times the patient must be rescanned in order to obtain more accurate data and assess confounding factors such as discolorations, moisture content, recent fingernail clipping and co-existing illness, for example. Infant or younger pediatric patients who may also be preferentially exposed, would typically be unable to remain still for such long scan times or may not have sufficiently developed teeth (for example, deciduous teeth may be too small for an accurate measurement). Likewise, elderly patients or those with significant prior dental work may not be eligible for this test and are less likely to accurately describe symptoms. Lastly, the associated test equipment is fairly expensive, with an estimated cost of several hundred thousand dollars, and, as noted above, is delicate, large and requires specially trained personnel to operate.

Even if the current in-vivo fingernail or tooth test equipment were operationally viable, and logistically considerations such as high replacement and storage costs were appropriately addressed, the difficulty of moving delicate and bulky equipment, expendables, such as magnetic coils, plastic coverings, OSHA protections, gloves, gowns, masks, and other supplies, become very expensive and time consuming. Aside from the mentioned concerns, current in-vivo fingernail or tooth dosimetry still has limited capability for assisting in the screening and triage of many hundreds of thousands or millions of victims/patients in a clinically meaningful time frame. Such equipment can only test approximately 4 patients per hour that translates to about 48 patients per day and 96 patients over the course of two days. This time frame is too long, and would limit the number of patients able to receive care within the time when it is highly recommended for medical treatment for radiation exposure. Further illness and death would result from delays in decontamination, evacuation and supportive care. Accordingly, such test equipment is unacceptable for assisting with the screening and triaging of many hundreds of thousands of potential patients who would likely be seeking testing after a large-scale radiological event.

Generally speaking, there is a concern relating to two types of exposure: acute and chronic. An acute exposure is a single accidental exposure to a high dose of ionizing radiation over a short period of time directly resulting in acute radiation illness when exposure is high enough. An acute exposure has the potential for producing both nonstochastic and stochastic effects. Chronic exposure, which is also sometimes called "continuous exposure," is long-term, low level overexposure. Chronic exposure may result in stochastic health effects and is likely to be the result of improper or inadequate protective measures. As is well known in the art, there are three basic ways of controlling exposure to harmful radiation, namely, 1) limiting the time spent near a source of radiation, 2) increasing the distance away from the source, 3) and using shielding to stop or reduce the level of radiation. In addition, the radiation dose is directly proportional to the time spent in the radiation. Therefore, a victim/patient should not stay at or near a source of radiation any longer than is absolutely necessary. The following equation can be used to make a simple calculation to determine the dose that will be or has been received in a radiation area.

$$\text{Dose} = \text{Dose Rate} \times \text{Time}.$$

It is to be appreciated that increasing distance from the source of radiation will reduce the dose of ionizing radiation received by a victim/patient. That is, as the radiation travels from the source, the radiation spreads out and becomes less intense. This phenomenon can be expressed by an equation known as the inverse square law, which states that as the radiation travels out from the source, the dosage decreases inversely with the square of the distance.

$$\text{Inverse Square Law: } I_1/I_2 = D_2^2/D_1^2$$

As noted above, shielding is a way to reduce exposure to radiation. Generally, the denser the shielding material is, the greater the protection that will be provided by the shielding material. For example, depleted uranium and other heavy metals, like tungsten, are very effective in shielding radiation because their tightly packed atoms make it difficult for radiation to travel through the material without interacting with the atoms. Lead and concrete are the most commonly used radiation-shielding materials primarily because they are easy to work with and are readily available materials. Concrete is commonly used in the construction of radiation vaults.

As evident above, a continuing need exists for a radiation exposure self-test that will provide a near real-time, rapid and accurate indication of radiation exposure.

SUMMARY OF INVENTION

Wherefore, it is an object of the present invention to overcome the above-mentioned shortcomings and drawbacks associated with currently available prior art indicating, and screening and triaging systems, methods and techniques.

Another object of the present invention is to provide a portable, noninvasive self-testing test device and method that permits a significant number of victims/patients to self-screen themselves, e.g., self-screen a fingernail within a relatively short duration of time, e.g., within less than 1 minute (total cycle time) and more preferably self-screen themselves utilizing an Optimized Personal Dosimeter (OPD) in about 10-20 seconds while still obtaining reliable test results concerning each such patient's exposure to radiation.

Still another object of the present invention is to incorporate the noninvasive self-testing test device, e.g., such as a fingernail, a driver's license, both non-invasive into a lightweight, portable kiosk that can be regionally staged and readily transported to a desired location for use. Preferably, the kiosk will have multiple power options including battery-operated as well as have wireless telecommunication capabilities so that the noninvasive self-testing test device is able to operate without being supplied with electrical power or hard wire for communication.

A further object of the present invention is to quickly provide the victim/patient substantially instantaneously with his/her self-testing results in a way that is easily and readily visible to the victim/patient and the treating medical personnel, upon completion of the self-testing test, so that the victim/patient can be informed as to whether immediate medical countermeasures and/or medical treatment is required for the victim/patient or whether medical countermeasures and/or medical treatment can be delayed for a relatively short duration of time, e.g., a few days to a week or so, so as to permit the other, more seriously irradiated potential patients, to be treated first. This will allow the patient to make an informed decision regarding their care utilizing the readings that are readily available.

A primary object of the present invention is to provide a system and a method that assists with self-testing by the potentially exposed potential patients so as to free up the limited available nonmedical and medical staff, medical equipment, countermeasures, transportation resources, hospital beds, etc., so that the nonmedical and medical staff can devote their attention to administering medical countermeasures and/or medical treatment to the potential patients requiring immediate medical attention.

Yet another object of the present invention is to provide substantially instantaneous results, to the self-screened victim, so that a majority of the population, who may have only been exposed to clinically minimal doses of ionizing radiation (e.g., less than about 1-2 Gy for example) can be placed at ease and thereby minimize the possibility of public panic and civil unrest that would otherwise accompany a nuclear detonation, or a similar destabilizing disaster.

A further embodiment of the system should be to measure and record the lower doses of less than 2-4 Gy in increments of approximately 0.1 Gy to support military combat readiness and deployment decisions and non military exposures for long term follow-up, and continued monitoring for continuing exposure or re-exposure.

A still further object of the present invention is to quickly, reliably and accurately facilitate self-testing of the exposed and potentially exposed population so that the potentially exposed population can be readily and quickly segregated and triaged into at least two of groups, namely (1) a first group of potential patients who were exposed to a clinically significant dose of ionizing radiation (e.g., exposed to a dose of ionizing radiation greater than 2 Gy, for example, and thus most likely require immediate medical countermeasures and/or medical treatment), and (2) a second group of potential patients who were not exposed to a clinically significant dose of ionizing radiation (e.g., only exposed to a dose of ionizing radiation less than 1-2 Gy, for example and thus most likely do not require any immediate medical countermeasures and/or medical treatment. In this way, the available medical resources, in near real time, (e.g., the medical and support personnel, the medical countermeasures, the medicines, etc.) can be more efficiently and expeditiously utilized for treating only patients exposed to a clinically significant dose of ionizing radiation and thereby increasing the probability that a majority of those treated patients may successfully respond to the administered medical countermeasures and/or medical treatment. That they do not require immediate medical care may assist with maintaining evacuation and facilitate directing necessary potential patients to local hospitals, shelters and Red Cross sites and the like. This also facilitates real time allocation of available resources based on the number of victim/patient self-screened, the medical doses and additional resources administered/utilized for such exposed potential patients.

A further object of the invention is to provide a vast majority of citizens with an optimized card (e.g., a driver's license, a voter ID card, an employee ID card, a college/student ID, a bank or other credit card, a dog tag, etc.) that will generally be carried within the general population a majority of the time and contains a substrate embedded in the plastic matrix, added as an additional layer of film, strip, pellet or area of dense concentration, that is designed to absorb and retain varied radiation exposure and change physical characteristics so that such substrate can be an accurate indicator of the dose of ionizing radiation that the potential victim/patient has been exposed to acutely and over the lifetime of the victim. The substrate/matrix could also maximize measurement of different particles or energy levels seen in radiological exposures, and previous exposure readings will be stored for lifetime cumulative doses or environmental or occupational exposure.

Still another object of the present invention is to incorporate the noninvasive self-testing test device, according to the present invention, into a relatively lightweight, easily deployable and portable kiosk (e.g., preferably weighing less than 30 pounds and more preferably weighing about 10 pounds or less) of which a majority of the population is quite familiar with and can be readily used to administer the self testing of the potential victim/patient in a quick and convenient manner. All of the associated components, including a suitable power supply such as a battery as well as a wireless transmission transmitter and receiver, are contained within the kiosk and thereby this facilitates ease of transport and set up by personnel.

Yet another object of the present invention is to provide each of the noninvasive self-testing test devices with the number of power imports to facilitate either recharging of the internal power supply or battery and/or the continuous supply of electrical power thereto.

A still further object of the present invention is to facilitate ease of cleaning of the noninvasive self testing test device, following each use, so as to prevent or minimize generation of any false reading(s). Further, each noninvasive self-testing test device will have the capability of verifying and calibrating the test results to facilitate further triaging of each victim/patient following self-testing by the noninvasive self-testing test device.

Another object of the present invention is to incorporate a magnetic strip, a chip or some other conventional informational, visual or data/electronic storage mechanism or device on or into the OPD so that such information or data can be easily and accurately read during the self-testing, and thereby provide medical personnel with the desired relevant information relating to the potential victim/patient, e.g., the street where the victim/patient resides, the sex of the victim/patient, the year in which the victim/patient was born, etc., without violating any of the Health Insurance Portability and Accountability Act of 1996 (HIPAA) Privacy and Security Rules and Laws. Such information may be very useful in determining an area or areas of a city, town or region in which a majority of the population was exposed to a clinically sufficient dose of ionizing radiation so that such information may be utilized to assist with triaging of any victim(s)/patient(s) who did not have his/her designated card in his/her possession at the time of possible exposure to radiation. Such victim/patient can then merely indicate where he/she was located, at the time of the incident, and the medical personnel can then make an educated determination of whether or not either immediate medical countermeasures and/or medical treatment are required for such victim/patient or whether such medical countermeasures and/or medical treatment may be delayed. It is important to note that due to the EMP of a blast, embedded chips and other infrastructure may be damaged and therefore each kiosk reading may be limited to the exposure reading only from the OPD.

Still another object of the present invention is to facilitate communication (e.g., preferably wireless communication or by direct connection via electrical wires) between each one of the noninvasive self-testing test devices and a wireless control center to facilitate the exchange of information as well as facilitate control and/or modification of the radiation threshold of each one of the self-testing test devices, in real-time, so as to facilitate more efficient triaging and allocation of resources of the potential patients which may have been exposed to radiation.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which.

DETAILED DESCRIPTION

Figure 1:
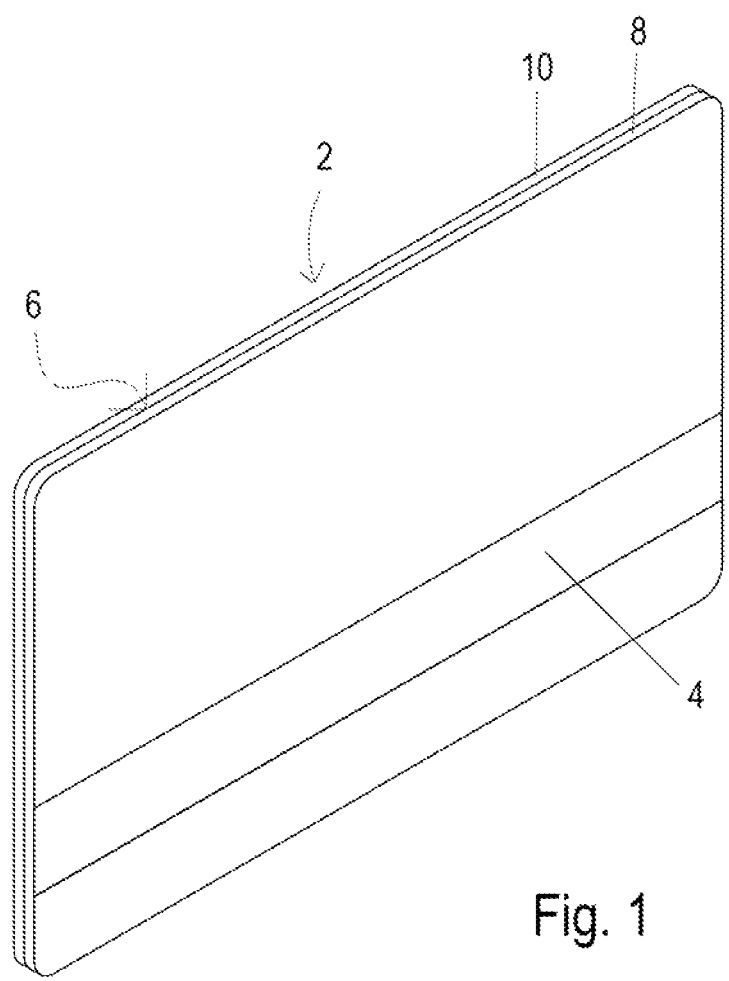
FIG. 1 is a diagrammatic perspective view of a designated card containing a first substrate of retaining and indicating any exposure to high-energy radiation and a second substrate capable of retaining and indicating any exposure to low-energy radiation, with an integral magnetic strip.

The present invention relates to a radiation exposure test and, more particularly, to a system and a method for a radiation exposure self-test (REST) for exposure to ionizing radiation that, when compiled with clinical presentation, environmental, demographic, and other population readings, will provide a near real-time, rapid and accurate indication of radiation exposure. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first an introduction provides the reader with a general understanding of the present invention. Finally, specific details of the present invention are provided to give an understanding of the specific aspects.

(1) Introduction

The present invention relates to a Radiation Exposure Self-Test (REST) and method for facilitating reliable noninvasive kiosk based self-testing of multiple potential patients to determine which of those potential patients were exposed or continue to be exposed to a clinically sufficient dose of ionizing radiation from an nuclear detonation, radiological dispersal device, or other intentional, accidental nuclear or radiological event.

The system and method provides a direct physical indicator self-test for exposure to ionizing radiation that, when compiled with clinical presentation, environmental, demographic, and other population readings will provide a near real-time, rapid and accurate indication of exposure. Rapid evaluation of exposure to radiation can help quickly determine how many potential patients/victims were exposed to a sufficient dose of penetrating radiation so as to warrant immediate life saving medical treatment to prevent, or minimize, the impact of Acute Radiation Syndrome (ARS) and the Delayed Effects of Acute Radiation Syndrome Exposure (DEARE). After identifying and evacuating those who have been exposed to dangerous levels or radiation, first responders can evacuate or shelter the remaining potential patients/victims, who do not require immediate treatment, or identifying patients who require palliative and supportive care due to exposure of an excess dose of radiation.

Kiosk based self-directed measurements of an enhanced identification card that has been optimized to be able to be used as a measurement of radiation exposure by Rapid Scan enhanced micro-electron spin resonance (micro ESR), will greatly decrease the time of the overall process in assessing who has been exposed to a hazardous level of radiation. Analysis will also include environmental factors, plume analysis, intelligence, blast area assessment, and other physical indicators including field, dosimeter readings, clinical signs and symptoms, medical screening and triage with eventual medical diagnosis. Data collected in near real time will be incorporated into Medical Triage, Electronic Medical Records, and the Incident Command System in order to most efficiently treat the greatest number of potential patients within the shortest possible time period aiming to identify, then screen and triage all patients and provide treatment within a clinically significant time, with the available resources. In certain high-risk communities, countries, and urban areas or during periods of increased threat levels, (REST) units can be deployed or continuously operated for faster response time.

Although current art (Patel) describe bulk batching of cards for rapid reading, and self-read colorimetric cards, these are limited by cost, environmental influences, personal interpretations, life span, electromagnetic pulse vulnerability, and the logistical difficulties of separating the potential patient physically from the privately purchased colorimetric card. The REST Kiosk with OPD systems represent monumental advances from the current art in personal dosimetry and response to overwhelming mass casualty events. Self-testing allows results to be directly given to the potential patient within seconds after OPD insertion into the REST Kiosk, as well as immediate caching of data and downloading when networking is available.

Further details of the REST system according to the principles of the present invention are provided below.

(2) Specific Details of the Invention

The present invention will be understood by reference to the following detailed description that should be read in conjunction with the appended drawings. It is to be appreciated that the following detailed description of various embodiments is by way of example only and is not meant to limit, in any way, the scope of the present invention.

Turning now to FIG. 1, a brief description concerning the various components of the present invention will now be briefly discussed. As can be seen in this figure, a designated card 2 is generally in the shape of a driver's license, a voter ID card, a credit card or similar identification card normally carried by a potential victim/patient during the course of his/her day, or possibly a button or another piece of clothing which is worn regularly by the potential victim/patient. Preferably, the designated card 2 is a government issued picture identification card, such as a driver's license, a voter ID card, etc., or possibly a bank card, a credit card, a gift card, a college/student ID card, or the like, which also contains a conventional magnetic strip, a computer chip, or some other conventional information or data storing device 4 that contains desired demographic information concerning the potential victim/patient to whom the designated card 2 was issued. Such demographic information may comprise, for example, the full legal name of the card holder, the address of the card holder, the sex of the card holder, the date of birth of the card holder, the height and the weight of the card holder, the eye color of the card holder, etc. In the event that such information is not available or readable at the time of the scan, then the system and the method will only provide the radiation exposure.

As diagrammatically shown in FIG. 1, the designated card 2, according to this embodiment, generally comprises a laminated structure 6 which comprises both a first material, layer or substrate 8 and a second material, layer or substrate 10. Typically, both the first and the second substrates 8, 10 are sandwiched between a pair of outer protective layers of the designated card 2. If desired, each one of the first and the second substrate 8, 10 may also be completely encased or covered with a protective layer. The first substrate 8 is capable of retaining and indicating any exposure (e.g., gamma radiation) to high-energy radiation of the victim/patient carrying the designated card 2. A suitable first substrate 8, for retaining and indicating any high-energy radiation exposure of the victim/patient, is alanine or calcium formate, for example. The second substrate 10 is capable of retaining and indicating any exposure (e.g., to X-rays) to low-energy radiation, of the victim/patient carrying the designated card 2. A suitable second substrate 10, for retaining and indicating any low-energy radiation exposure, is seashell or hydroxyapatite, for example. Both substrates are capable of retaining free radicals that are indicative of the radiation exposure of the victim.

Figure 1A:
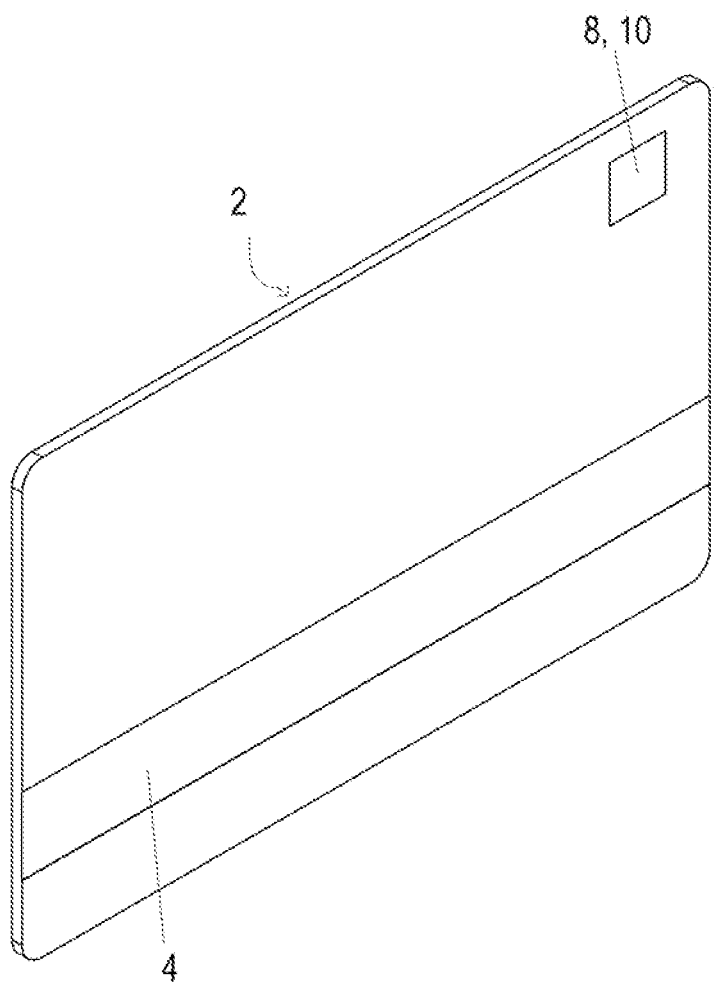
FIG. 1A is a diagrammatic perspective view of a designated card that has a combined substrate containing both a first substrate capable of retaining and indicating any exposure to high-energy radiation and a second substrate capable of retaining and indicating any exposure to low-energy radiation, with an integral magnetic strip.

Turning now to FIG. 1A, a second embodiment of the designated card 2 is diagrammatically shown. According to this embodiment, at least the first substrate 8, and more preferable in both the first substrate 8 and the second substrate 10 (combined) are located in a desired section, e.g., in a corner region, along an edge region, etc., of the designated card 2. As with the previous embodiment, the designated card 2 is also provided with a conventional magnetic strip, a computer chip, or some other conventional information or data storing device 4 that contains the desired demographic information concerning the victim/patient to whom the designated card 2 was issued so that all, or only a desired or authorized portion, of such information or data, can be read and used to facilitate treating of the other potential patients (elderly, disabled, pediatric i.e.) that were in the vicinity of the nuclear detonation, but may not have had his/her designated card 2 in his/her possession at the time of the improvised nuclear detonation or to facilitate collection of such data for use in connection with a future radiological exposure.

Figures 2, 2A:
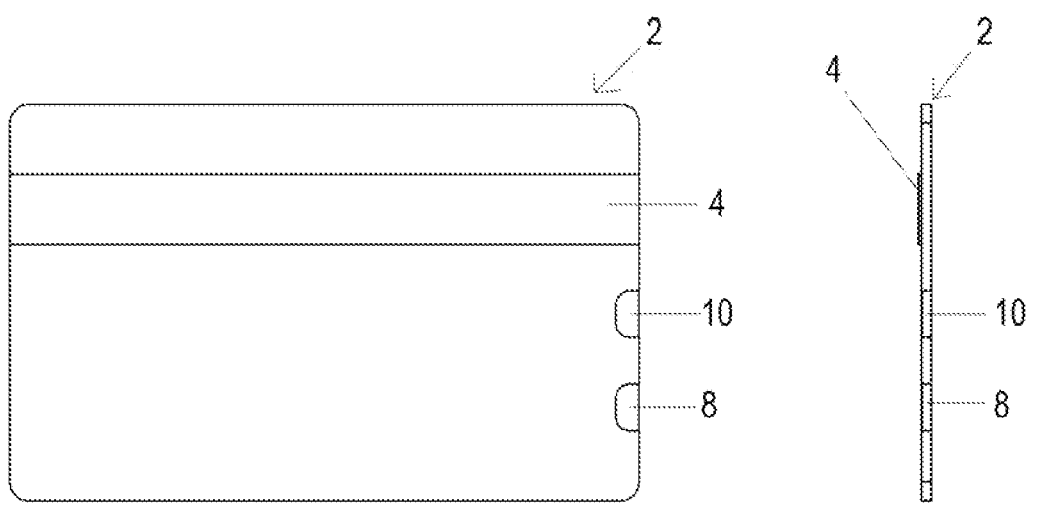
FIG. 2 is a diagrammatic front elevational view showing a slight variation of the designated card, according to the present invention.
FIG. 2A is a right side elevational view of FIG. 2.

A slightly modified version of the designated card 2 is diagrammatically shown in FIGS. 2 and 2A. That is, according to FIGS. 2 and 2A, the first and the second strips 8, 10 are shown separate from one another along the same side edge of the designated card 2 while a conventional magnetic strip, or other conventional information or data-storing device 4, extends along the entire width of the designated card 2.

Figure 3:
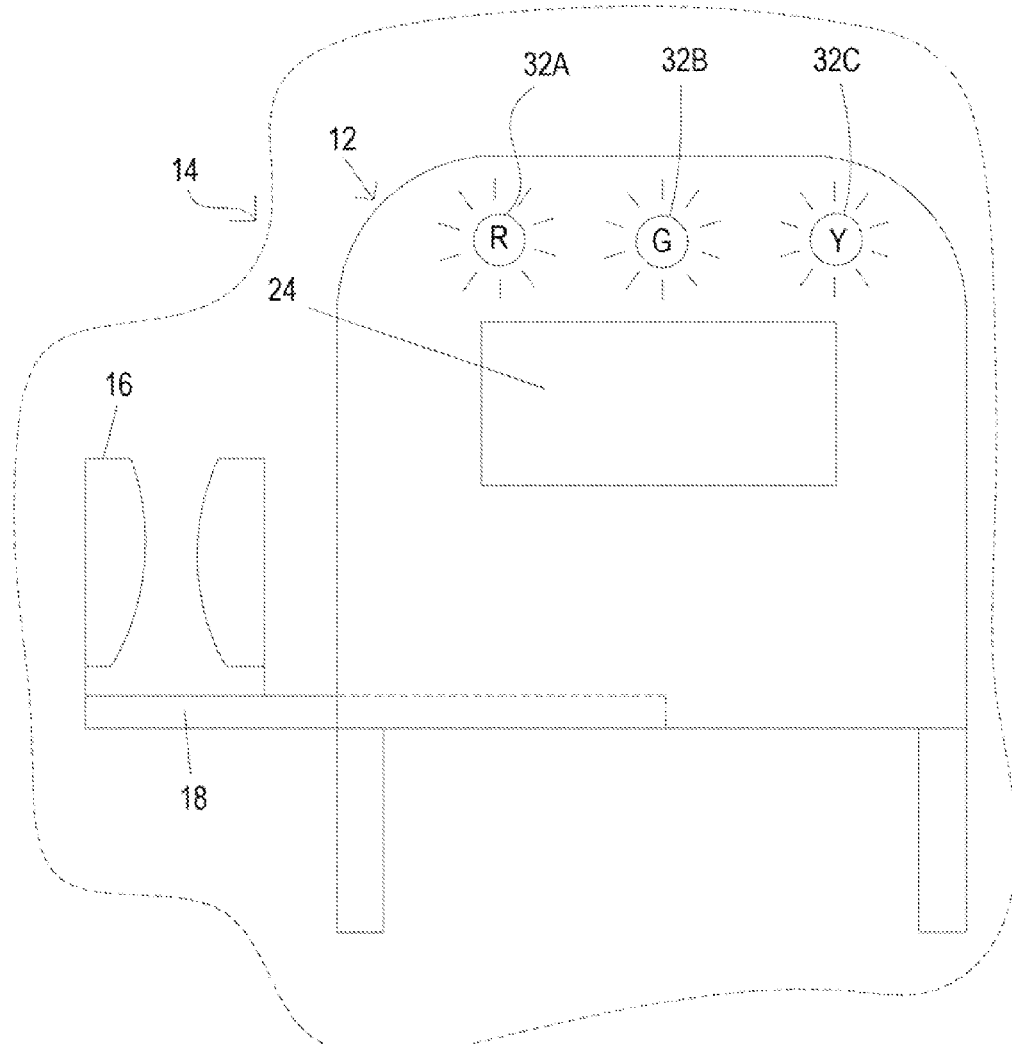
FIG. 3 is a diagrammatic view of a noninvasive self-testing test device, according to the present invention, in a first loading position for receiving the designated card that contains both the first and the second substrates, for self screening to provide a reliable indication of whether or not the victim/patient to whom that designated card was issued, was exposed to a clinically sufficient dose of ionizing radiation.
Figure 3A:
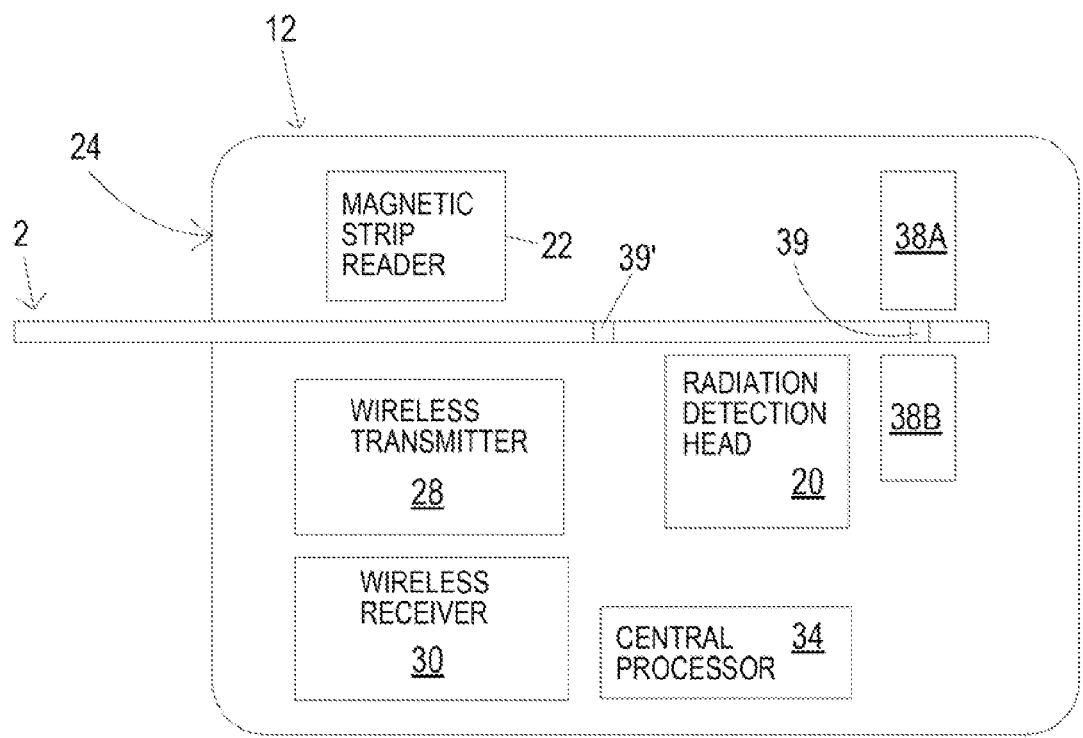
FIG. 3A is a diagrammatic view of the noninvasive self-testing test device, according to the present invention, in a second scanning position in which the designated card is inserted within the noninvasive self-testing test device for determining exposure of the first and/or second substrates to radiation and simultaneously reading the magnetic strip contained on the card—the measurement device may be, for example, an electron spin resonance spectrometer, an optical spectrometer, or a MOSFET-based electronic dosimeter.

With reference now to FIGS. 3 and 3A, a discussion concerning suitable noninvasive self-testing test device 12, for providing self-testing of a designated card 2, by the potential victim/patient to whom the designated card 2 was issued, will now be provided. One suitable noninvasive self-testing test device, for providing self-testing of the designated card 2, is generally disclosed and described in U.S. Pat. Nos. 7,868,616 and 7,589,529 and the full teaching and entire disclosure, of both of those patents, is incorporated by reference in their entireties into this application. However, such conventional noninvasive self-testing test device must be modified in order to receive and test the designated card 2, according to the present invention, as will be described below in further detail. Preferably, such noninvasive self-testing test device 12, according to the present invention, weighs about 20 pounds or less so as to facilitate incorporating such test equipment into a self-standing kiosk 14, or some other light weight readily portable or transportable device.

As generally diagrammatically shown in FIG. 3, the noninvasive self-testing test device 12 is equipped with a movable cardholder 16 that slides along a track 18. The movable cardholder 16 generally has two positions, namely, a first extended/loading position in which the cardholder is positioned and located for receiving the designated card 2 of the victim/patient to be self-tested and a second internal scanning/reading position in which the designated card 2 of the victim/patient to be self-tested, supported by the cardholder 16, is positioned and located for scanning or reading. When the movable cardholder 16 is in the first extended/loading position, such position facilitates a victim/patient placing his/her designated card 2 on the cardholder 16 located along the slidable track 18, as generally shown in FIG. 3. Once the designated card 2 is supported and retained by the cardholder 16, the victim/patient then inserts or pushes the cardholder 16, retaining the designated card 2, along the track 18 into the interior compartment of the noninvasive self-testing test device 12, shown in FIG. 3A, for scanning by a radiation detection head 20 contained within the noninvasive self-testing test device 12. In addition, a conventional magnetic strip reader 22 is also located, within the interior compartment of the noninvasive self-testing test device 12, for reading the magnetic strip contained on the designated card 2.

As the designated card 2 passes by and swipes and/or rubs against the magnetic strip reader 22, or some other conventional information reading device, the desired or authorized portion of the victim's demographic information, contained on the designated card 2, can be read by the magnetic strip reader 22 in a conventional fashion. It is to be appreciated that in order to comply with the HIPAA Privacy and Security Rules, only certain bits of information, contained on the magnetic strip 4 of the designated card 2, may be actually retrieved by the magnetic strip reader 22, or some other conventional information reading device, e.g., the address of the designated card 2 holder, the sex of the card holder, the year which the card holder was born, etc. A front panel of the noninvasive self-testing test device 12 typically has a user interface 24 by which the victim/patient can answer one or more questions and thereby authorized reading of all, or only an authorized portion, of the demographic information contained on the magnetic strip 4. It is to be appreciated that at least the address, of each of the potential patients being self-screened, can be particularly useful because such information may assist emergency personnel with determining which area(s) or region(s), in the vicinity of the nuclear detonation, were exposed to a clinically significant dose of ionizing radiation and such information can assist with triaging many potential patients prior to any of those potential patients performing a self-testing of their associated designated cards 2.

Once the designated card 2 is fully inserted into and properly aligned with the radiation detection head 20, contained within the self-testing test equipment as generally indicated by FIG. 3A, at least the first substrate 8 can be read, in a conventional manner, by the radiation detection head 20 of the noninvasive self-testing test device 12 within a relatively short duration of time, e.g., typically about 20 seconds or less, more preferably about 15 seconds or less, and most preferably within a few seconds or less. It is to be appreciated that rather than a single scan or reading, the device 2 may perform between 2 to 10 readings, for example, and then averaged the results of each reading in order to provide a more reliable indicator of the amount of exposure to radiation detected on the scanned designated card 2. Preferably, the device is able to perform 10-100 kilo-cycles/second. Preferably both the first substrate 8 and the second substrate 10 can be simultaneously scanned and read by the radiation detection head 20 of the noninvasive self-testing test device 12 typically within 20 seconds or less.

The noninvasive self-testing test device 12 is typically provided with an indicator device or mechanisms 32A, 32B and 32C, which readily displays the scanned radiation results of at least the first substrate 8 of the designated card. 2 currently located within the noninvasive self-testing test device 12, e.g., whether or not at least the first substrate 8 was exposed to a radiation dose greater than 2.5 Gy, for example. It is to be appreciated that the sensitivity of the radiation detection head 20 of the noninvasive self-testing test device 12 can be easily and readily adjusted, e.g., upward to 2.6, 2.7 . . . 3.0 Gy, for example, or downward to 2.4, 2.3 . . . 2.0 Gy for example, as necessary, depending upon the amount of potential patients which are determined to have been exposed to a clinically significant dose of radiation. Direct readings of exposure throughout the range of exposure will also be readily available to victims/patients and to first responders and medical personnel.

Figure 4:
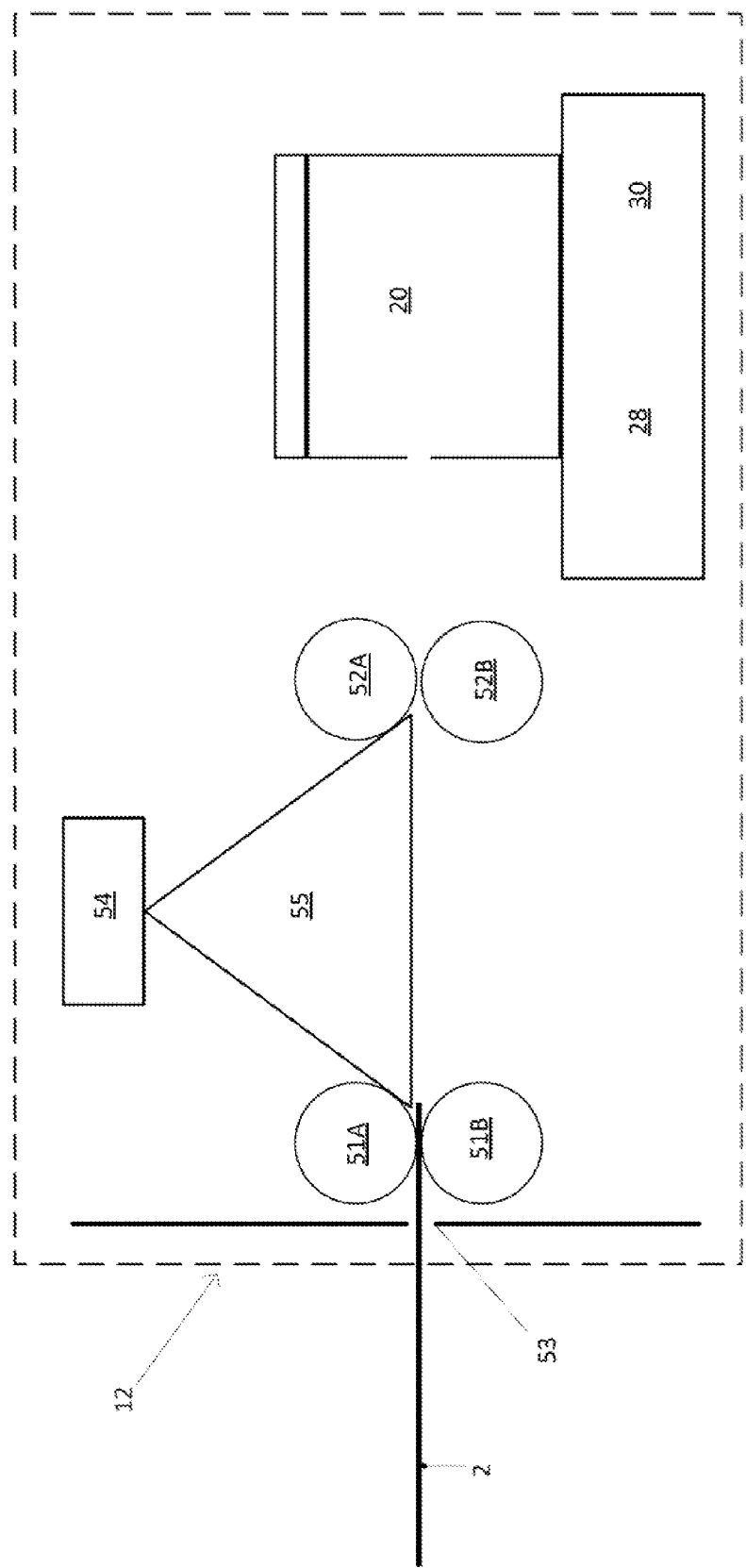
FIGS. 4, 4A and 4B respectively show an alternative embodiment of the noninvasive self-testing test device, according to the present invention, in a first loading position for receiving the designated card, in a second scanning position for scan the data contained on a conventional magnetic strip, and in a third reading position for scanning, via a radiation detection head, of the radiation exposure of the designated card.
Figure 5:
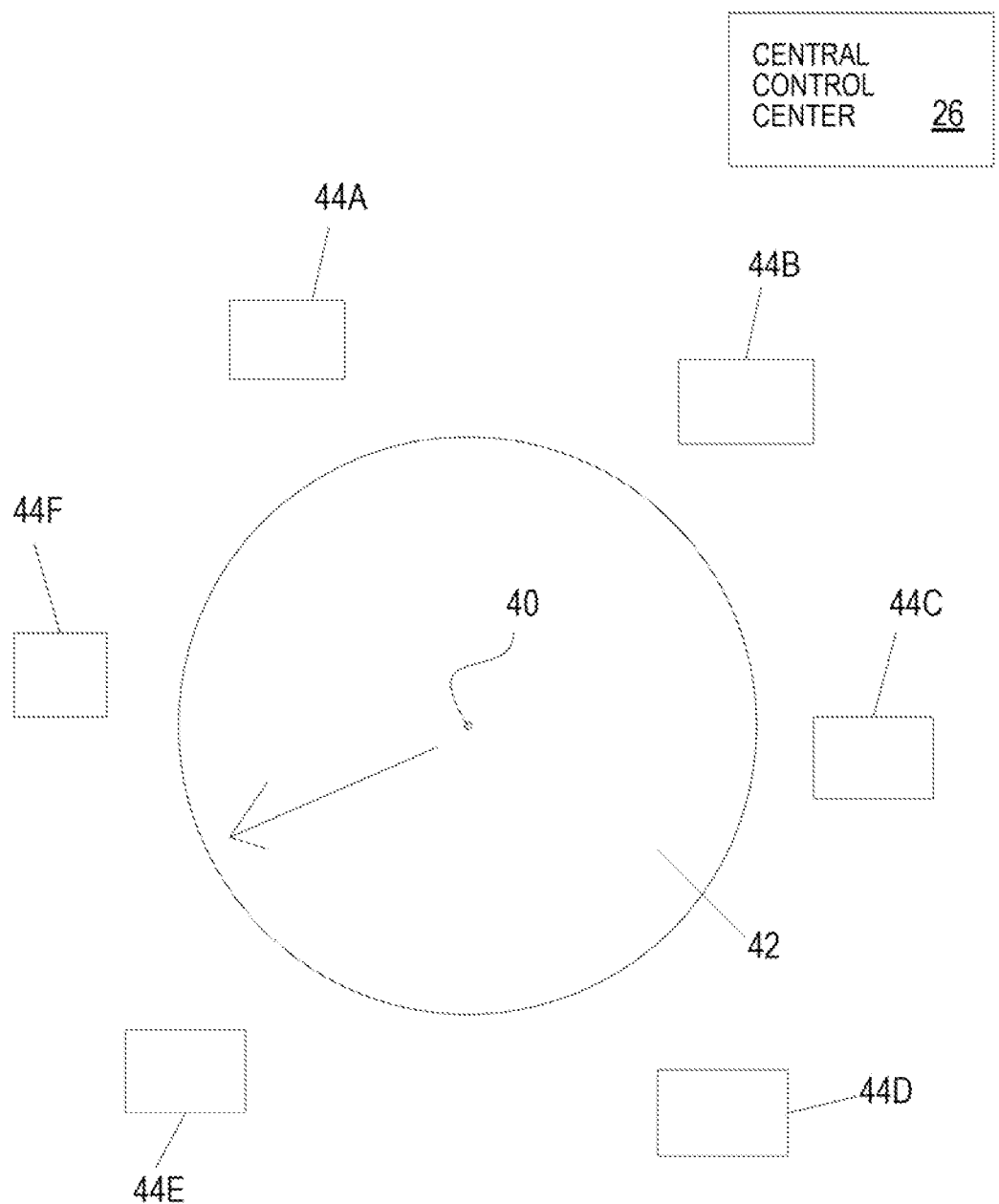
FIG. 5 is a diagrammatic view of showing a location where a nuclear detonation, e.g. a nuclear event, occurred and a radiussed area, a safe distance away from the nuclear detonation, diagrammatically showing a plurality of peripheral sites that were temporarily set up to assist potential patients with self-testing of their designated cards to determine exposure of his/her first and/or the second substrates, contained on or incorporated into the designated card, for determining whether or not such victim/patient was exposed to a clinically sufficient dose of ionizing radiation.

It is to be appreciated that all of the noninvasive self-testing test devices 12 may be interconnected with one another, via electrical wires or a wireless network, to facilitate communication with a central control center 26 as shown in FIGS. 4 and 5. The central control center 26 (see FIG. 5) and/or each one of the noninvasive self-testing test devices 12 may be provided with an algorithm that determines the radiation threshold, e.g., 2.5 Gy, and then periodically adjusts the radiation threshold, either upward or downward, depending upon the quantity of the self-testing results which indicated that potential patients requiring medical countermeasures and/or medical treatment. That is, about 90% of the potential patients being tested should typically be determined as requiring either delayed, or possibly no, medical countermeasures and/or medical treatment, while about 10% of the potential patients being tested should typically be determined as requiring further screening, triage and immediate medical countermeasures and/or medical treatment.

Preferably each of the noninvasive self-testing test devices 12 is equipped with both a wireless transmitter 28 and a wireless receiver 30, as well as conventional input and output connections, in order to facilitate wirelessly/direct receiving and transmission of information and commands to and from the central control center 26, thereby facilitate substantially instantaneous exchange of information and commands. The wireless transmitter 28, the wireless receiver 30 the user interface 24 and an indicator mechanisms 32A, 32B and 32C (discussed below) are all coupled to a central processor 34, of the noninvasive self-testing test devices 12, which facilitate control of each of those components.

It is to be appreciated that the indicator mechanisms 32A, 32B and 32C of the noninvasive self-testing test device 12 could merely be provided with a set of lights, e.g., "red" light, 32A, a "yellow" light 32C, an a "green" light 32B, or direct read, for example. That is, if the radiation detection head 20 of the noninvasive self-testing test device 12 determines that the first substrate 8 was radiated with a radiation dose of greater than 2.5 Gy, for example—with the radiation threshold being 2.5 Gy, for example, then the first light (e.g., the "red" light 32A) is illuminated thereby indicating that immediate medical attention is required by the patient p the currently scanned designated card 2. However, if the radiation detection head 20 of the noninvasive self-testing test device 12 determines that the first substrate 8 was radiated with a radiation dose of 2.5 Gy or less, for example—with the radiation threshold being 2.5 Gy, for example, then the second light (e.g., the "green" light, 32B) is illuminated thereby indicating that either delayed, or possibly no, medical countermeasures and/or medical treatment is currently required by the victim/patient owning the currently scanned designated card 2.

Alternatively, in lieu of the indicator mechanisms 32A, 32B, 32C of the noninvasive self-testing test device 12 a mating punch and die set 38A and 38B which are arranged, on opposite sides of the designated card 2 being scanned, when the designated card 2 is located within the self-testing test equipment and supported by the cardholder 16. In the event that at least the first substrate 8 of the designated card 2 was scanned as being radiated with a radiation dose greater than 2.5 Gy, for example, then the designated card 2 is automatically punched/stamped, by the mating punch and die set of the noninvasive self-testing test device 12. The punch 38A, 38B, of the indicator mechanism, provides the designated card 2 with unique identification indicia 39 that indicates that the victim, to whom the designated card 2 was issued, requires immediate medical attention. Such punching of the designated card 2, with the unique identification indicia 39 will readily identify, to both the nonmedical and the medical staff, any victim(s)/patient(s) requiring immediate medical attention and this should minimize the possibility of any victim(s), who were tested and determined as not requiring any immediate medical attention, from being provided with immediate medical attention, when such medical attention is not currently required and in limited supply.

As indicated above, the noninvasive self-testing test device 12 may be adjusted so that if the scanned result of at least the first substrate of the designated card 2 is within the range of 2-3 Gy, for example, then either delayed or possibly no medical attention is required for victim/patient owning such scanned designated card 2. However, if the scanned result of at least the first substrate of the designated card 2 is greater than 2-3 Gy but less than 8 Gy, for example, then this would tend to indicate that immediate medical attention is warranted and required for victim/patient owning such scanned designated card 2 so that further screening or triage of such victim/patient, in the medical treatment area, can then occur, e.g., the victim/patient may be given a blood test, urine test, respiratory or conventional diagnostic tests to determine more accurately the actual dose of ionizing radiation that the victim/patient was exposed to and design and implement a suitable treatment plan for treating such exposed victim/patient.

For any victim/patient who may have received a generally lethal radiation exposure, e.g., greater than 8-10 Gy, for example, the designated card 2 of such victim/patient could be indicated by third light, e.g., a "yellow" light 32C, for example, and/or marked with a second unique identifying indicia, 39', by the mating punch and die set 38A and 38B, respectively, to indicate to both nonmedical and medical personnel that an alternative medical treatment procedure should be administered to such victim/patient.

It is to be appreciated that depending upon the amount of potential patients that are self-screened by the noninvasive self-testing test device 12, as well as the initial results of the self-testing of the designated cards 2 of such potential patients, the radiation threshold of one or more of the noninvasive self-testing test device 12 can be easily remotely modified or adjusted upward or downward by the central control center 26. That is, if the scanned results of the designated cards 2 of an excessively high number of potential patients, that were self-screened, are determined to have a radiation exposure of at least or greater than 2 Gy, for example, then the radiation threshold of one or more of the noninvasive self-testing test devices 12 can be modified to be higher such as 2-5 Gy, for example, so that only scanned results of the first substrate 8 of the designated card 2 which are at least or greater than 2.5 Gy will be indicated as requiring immediate medical attention while scanned results of the first substrate 8, of the designated card 2, which are less than 2.5 Gy will be indicated as requiring either delayed or possibly no medical attention.

Figure 4A:
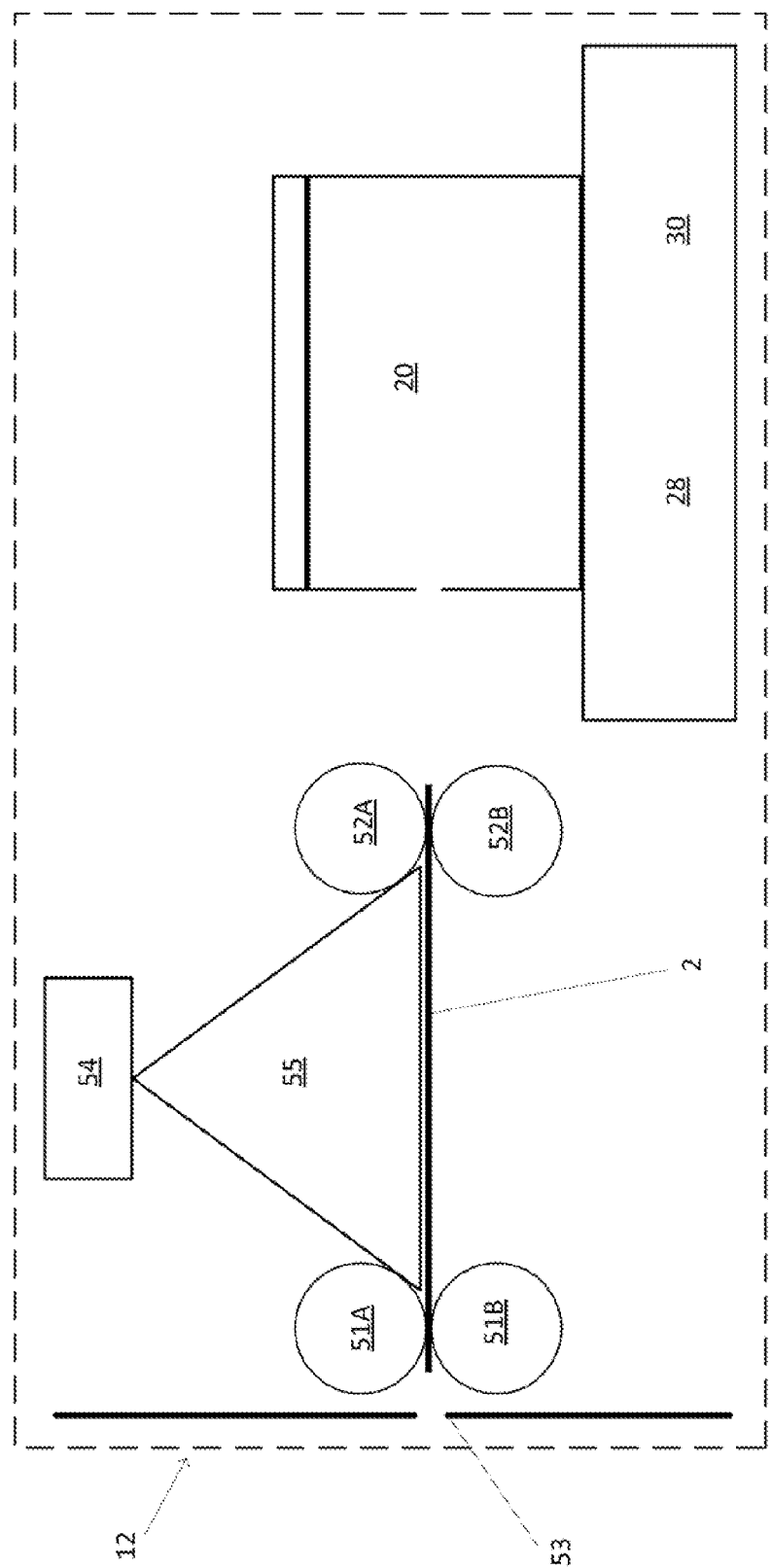
Figure 4B:
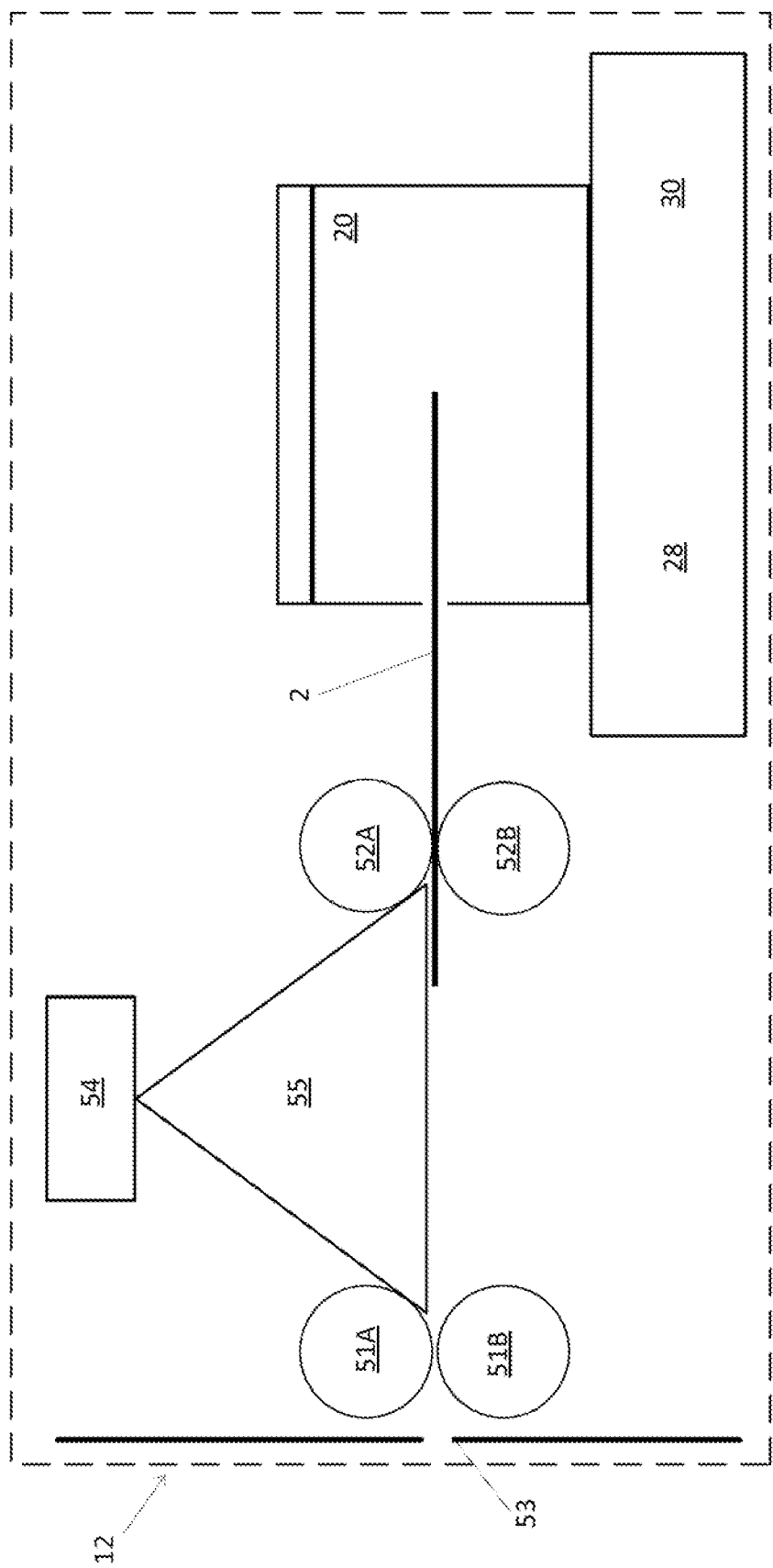

A slightly modified version of the noninvasive self-testing test device 12 is diagrammatically shown in FIGS. 4 and 4A and 4B. As this embodiment is quite similar to the previous embodiment, only the differences between this embodiment and the prior embodiment will be discussed in detail.

According this embodiment, a front portion of the kiosk 14 has an insertion aperture 53 that facilitates insertion of the designated card 2 into the self-testing test device 12. A first pair of mating rollers 51A, 51B are located within the self-testing test device 12 closely adjacent and on the opposite side of the insertion aperture IA. The first pair of mating rollers 51A, 51B initially engage with the designated card 2 (see FIG. 4), as the designated card 2 is initially inserted into the self testing test devices 12, so as to facilitate feeding of the designated card 2 into the self-testing test device 12.

A second pair of mating rollers 52A, 52B is spaced from the first pair of mating rollers 51A, 51B and the second pair of mating rollers 52A, 52B facilitate insertion of the designated card 2 into the measurement chamber 20 of the self-testing test device 12 where the amount of radiation, contained on the first substrate 8 and possibly the second substrate 10 of the designated card. 2, are detected (see FIG. 4B). As shown in FIG. 4A, when the designated card 2 is located between the first and second pairs of mating rollers 51A, 51B, 52A and 52B, the magnetic strip 4 of the designated card 2 is exposed and can be read by the magnetic strip reader 22 in a conventional manner or by an optical reader 54 having an optical field of view 55.

Figure 6:
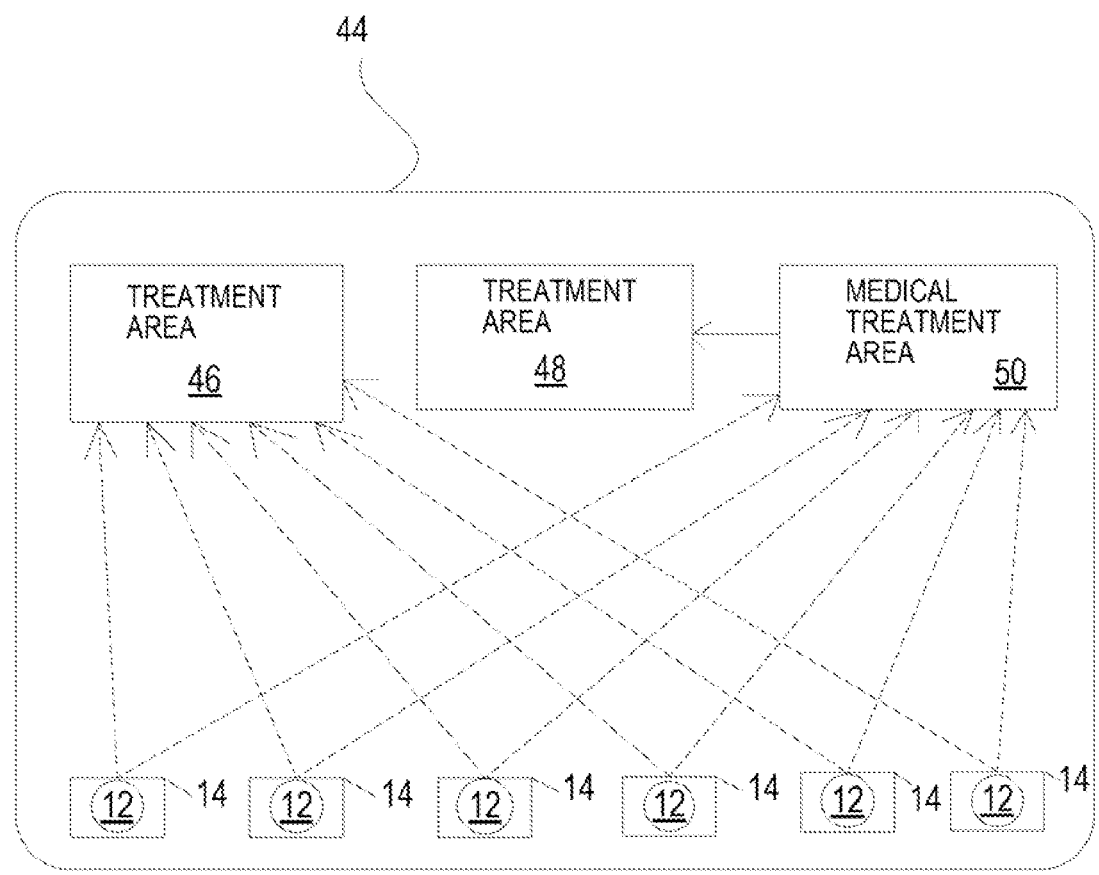
FIG. 6 is a diagrammatic view showing a typical arrangement for one of the plurality of peripheral sites in which each site is equipped with a plurality of the kiosk style noninvasive self-testing test devices to assist each potential victim/patient with self-testing of his/her designated card to determine the exposure of the first and/or second substrates (contained on the designated card of the victim) to radiation and assist with evacuating, sheltering and triaging all of the potential patients being self-screened into at least two groups of patients, and possibly three or four groups.

With reference now to FIGS. 5 and 6, use of the self-testing test devices to scan at least the first substrate 8 of the designated cards 2 of a plurality of potential patients in order to triage such potential patients, following a improvised nuclear detonation or some other mass disaster, will now be described. FIG. 5 is a diagrammatic map showing the nuclear detonation blast which hypothetically occurred at location 40 which may be in an urban area, for example, possibly a sports arena or some other private or public facility or structure where a large crowd of people periodically gather. According to this example, it is contemplated that tens of thousands of people to millions will be at, or in the vicinity of location 40 and were possibly exposed, to some extent, to radiation given off by this nuclear detonation or other mass casualty disaster.

Depending upon the size and content the nuclear detonation, it is conceivable that any and all potential patients located within radiussed area 42, e.g., a 2 mile radius, a 5 mile radius, a 10 mile radius, or possibly a 20 mile radius, for example, from location 40 where the nuclear detonation occurred, may potentially have been exposed to a clinically sufficient dose of ionizing radiation so as to warrant immediate medical countermeasures and/or medical treatment. Alternatively, there may be a number of potential patients who were not exposed to a clinically sufficient dose of ionizing radiation and thus not require any immediate medical attention and thus may be administered either delayed, or possibly no medical attention.

According to the present invention, as soon as practically possible after a nuclear detonation occurs at location 40, e.g., can be pre-staged or deployed within 1-5 hours, a plurality of remote peripheral self-testing sites 44A, 44B, 44C, 44D, 44E, 44F can be easily set up, by local, state and/or federal authorities, to facilitate self-testing of all of the potential patients who may have potentially been exposed to radiation that was given off as a result of the improvised nuclear detonation at location 40. As indicated in the Background Section of this disclosure, it is important to remove all potential patients, including all potential patients who may potentially have been exposed to such radiation as well as all potential patients who were not exposed to any radiation, a safe distance away from the nuclear blast site, at location 40, e.g., outside the radius of area 42, as soon as practically possible so as to limit any further or continued exposure of such potential patients to any residual radiation. The local, state and/or federal authorities will assist with prompt evacuation of all individuals a determined radius from location 40. Preferably, each one of these remote peripheral self-testing sites 44A, 44B, 44C, 44D, 44E, 44F will be located a safe distance away from the location 40, where the nuclear detonation occurred, so as to minimize any continued exposure of the potential patients to the radiation while, at the same time, each remote peripheral self-testing site 44A, 44B, 44C, 44D, 44E, 44F will also be located so as to provide relatively easy access by all potentially radiated potential patients in order to facilitate rapid self-testing of the desired potential patients, e.g., within 1 to 48 hours.

As diagrammatically shown in FIG. 6, each one of the remote peripheral self-testing sites 44A, 44B, 44C, 44D, 44E, 44F is typically equipped with a plurality of the noninvasive self-testing test devices 12 which are each typically incorporated and contained within a portable kiosk 14. Such kiosk style self-testing test devices 12, 14 can be readily and easily transported and setup, at a variety of desired locations about the periphery of area 42, within a very short duration of time, e.g. a few hours or so, and thereby permit self-testing by potential patients who may have been exposed to radiation shortly after the nuclear detonation or other mass disaster.

Each victim/patient will, during the self-testing procedure, individually scan his/her designated card 2 to determine the dose of ionizing radiation that is contained on at least the first substrate 8, and possibly the second substrate 10, of the designated card 2. As noted above, the amount of radiation contained on at least the first substrate 8 of the designated card 2 is a reliable indicator of the dose of ionizing radiation that the victim/patient, to whom the designated card 2 was assigned, was actually exposed during the nuclear detonation. The above is based upon the assumption the designated card 2 was in the actual possession of, or in close proximity to, the card owner/potential victim/patient at the time of the nuclear detonation. During a first process of the self-testing test, each victim/patient may first be asked (time permitting) whether or not the designated card 2 was in his/her possession at the time of the nuclear detonation. In the event that the answer is "yes", then the designated card 2 is scanned, as described above. However, in the event that the answer is "no", then the designated card 2 may possibly not be scanned and such victim/patient is generally referred to appropriate nonmedical support staff or personnel or possibly asked to provide their name and address and also indicate precisely where they were located at the time of the nuclear detonation or other mass disaster. In addition, they may provide further details concerning where they were from the time of the nuclear detonation up until the time of the attempted self-testing.

Thereafter, the nonmedical support staff or personnel, once a sufficient amount of information is collected from a plurality of self-screened potential patients, should be able to render an educated determination of whether or not such victim/patient, who did not have his/her designated card 2 in his/her possession at the time of the nuclear detonation, requires immediate medical attention or requires either delayed, or possibly no, medical attention at all. Such educated determination will typically be rendered by identifying a sufficient number of potential patients who were also at the same location(s) as, or in the same or in close proximity to, the victim(s)/patient(s) who did not have his/her designated card 2 in his/her possession at the time of the nuclear detonation. For example, if a number of potential patients who were also at the same location, or in the vicinity of, the victim(s)/patient(s) who did not have his/her designated card 2 in his/her possession at the time of the nuclear detonation were determined as requiring immediate medical attention, then the victim/patient who did not have his/her designated card 2 in his/her possession at the time of the nuclear detonation and was at the same location(s), or in close proximity thereto, most likely will require immediate medical attention and should be sent to the medical treatment area for further screening. If, on the other hand, a number of potential patients who were also at the same location(s), or in the same vicinity as, the victim(s)/patient(s) who did not have his/her designated card 2 in his/her possession at the time of the nuclear detonation were determined as requiring either delayed, or possibly no, medical attention at this time, then the victim(s)/patient(s) who did not have his/her designated card 2 in his/her possession at the time of the nuclear detonation and was at the same location(s), or in close proximity thereto, will most likely require either delayed, or possibly no, medical attention at this time.

Based upon the determined results of the self-testing test device, each self-screened victim/patient can then either be sent: (1) to a first treatment area 46 where a lower level or possibly delayed medical countermeasures and/or medical treatment can be arranged and/or administered to such victim/patient, or a delayed treatment program can be scheduled for such victim/patient and each victim/patient sent home, (2) to a second treatment area 50 where a treating drug(s) or medication(s) can be administered or possibly further screening of such victim/patient can occur, e.g., a blood, urine or other conventional testing can be performed in order to determine the full extent of the radiation exposure by that victim/patient so that suitable treatment plan can be immediately/promptly initiated for such victim/patient, or possibly (3) to a third treatment area 48 were alternative and/or appropriate medical countermeasures and/or medical treatment can be administered for any victim(s)/patient(s) who conceivably received a lethal dose of radiation.

As noted above, preferably the central control center 26 is connected wirelessly, or possibly hardwired, to each one of the noninvasive self-testing test device 12 located at each of the remote peripheral self-testing sites 44A, 44B, 44C, 44D. 44E, 44F. Such wireless communication facilitates transfer of the self-testing test results to the central control center 26 so that such nonmedical or medical personnel can instantaneously determine how many of the self-screened potential patients will require immediate medical attention.

In addition, as noted above, if the self-testing of at least the first substrate 8 of the designated cards 2 of the potential patients reveals that an excessively high amount of potential patients require immediate medical attention, then all adjustment control signal can be sent out, from the central control center 26 to each one of the noninvasive self-testing test device 12, to incrementally increase the radiation threshold at which a self-screened first substrate 8 will indicate that immediate medical attention is required. For example, if the radiation threshold is set at 2.5 Gy, then any scanned results of the first substrate 8 either at or above this threshold, this will result in an indication which indicates that immediate medical attention is required. Accordingly, the adjustment control signal would include, for example, a command to increase the radiation threshold to 2.7 or possibly 2.9, depending upon the initial self-testing results of the potential patients that were determined as requiring immediate medical attention.

Alternatively, if the self-testing of at least the first substrate 8 of the designated cards 2 of the potential patients reveals that an excessively low amount of potential patients require immediate medical attention, then an adjustment control signal can be sent out, from the central control center 26 to each one of the noninvasive self-testing test device 12, to incrementally decrease the radiation threshold at which a self-screened first substrate 8 will indicate that immediate medical attention is required. For example, if the radiation threshold is set at 2.5 Gy, then any scanned results of the first substrate 8 either at or above this threshold, this will result in an indication which indicates that immediate medical attention is required. Accordingly, the adjustment control signal would include, for example, a command to decrease the radiation threshold to 2.3 or possibly 2.1, depending upon the initial self-testing results of the potential patients that were determined as requiring immediate medical attention.

Figure 7:
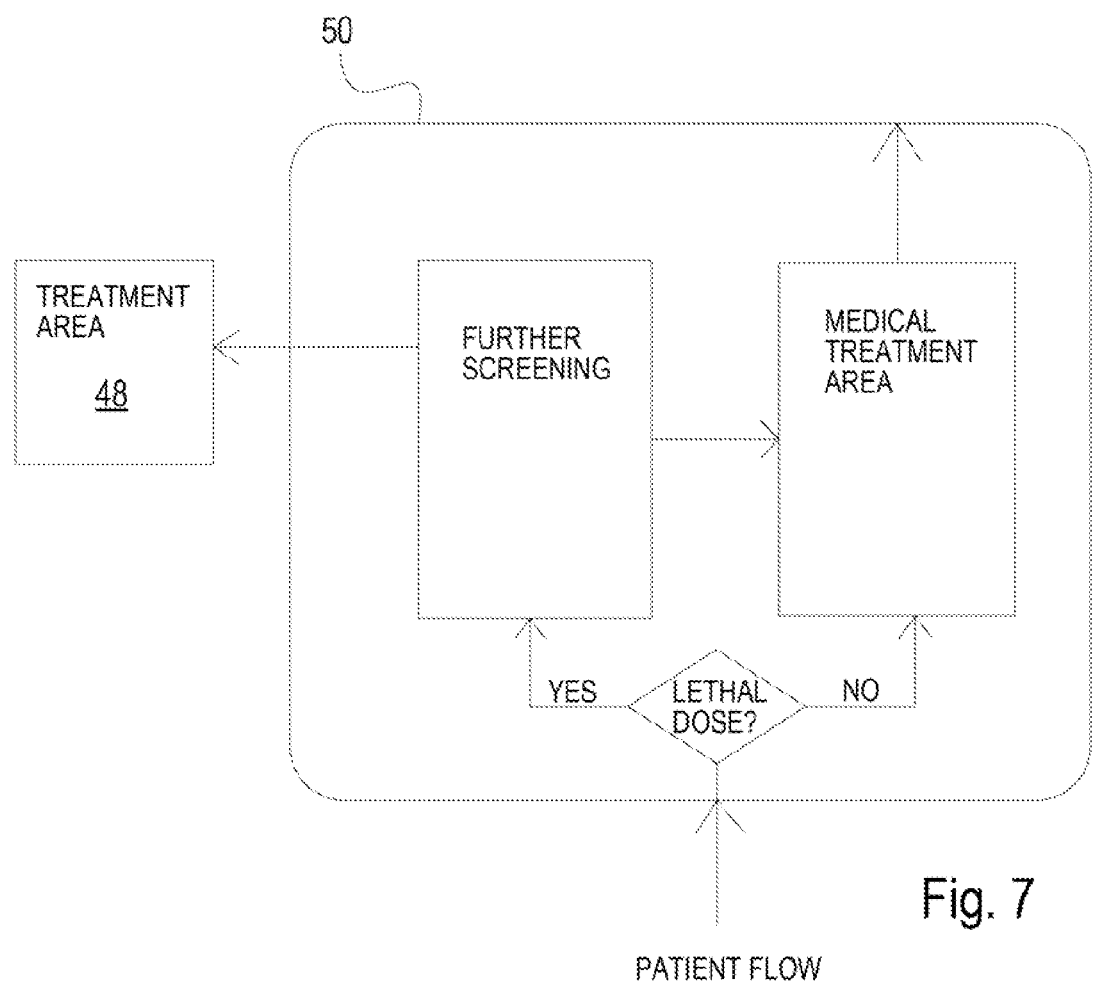
FIG. 7 is a diagrammatic depiction of a medical treatment area, either located as part of, adjacent to or not far from one or more of the plurality of peripheral triage sites, to which the potential patients who were determined as being exposed to a clinically significant dose of radiation are directed for administration of medical treatment.

With reference now to FIG. 7, a discussion, relating to the second treatment area 50 will now be provided. As noted above, all potential patients directed to the second treatment area 50 will eventually be administered at least one medical countermeasure(s) and/or provided with some medical treatment. However, the amount and type of medical countermeasures and/or medical treatment, to be administered to each one of the potential patients in the second treatment area 50, may possibly vary from victim/patient to victim/patient. For example, if a relatively low number of potential patients are currently located at the second treatment area 50, then further screening of all or most of such potential patients can generally occur e.g. a blood, urine or conventional testing can be performed to determine the full extent of the radiation exposure by each such victim/patient so that a suitable treatment plan can be devised and implemented for each victim/patient. Moreover, such further screening or testing of all, or many, of the potential patients located at the second treatment area 50 facilitates further triaging and segregation of the patient(s)/victim(s), who conceivably received a lethal dose of radiation, e.g., victim(s)/patient(s) who should be sent to the third treatment area 48 where alternative and/or appropriate medical countermeasures and/or medical treatment can be administered, from those potential victim(s)/patient(s) who received a clinically sufficient, but treatable, dose of ionizing radiation. Such further triaging thereby ensures that the available medical medications and/or drugs are only administered to those potential patients who received a clinically sufficient, but treatable dose of ionizing radiation, and thereby conserves precious medical treating resources for the patient(s)/victim(s) who could benefit most from the available medical treating resources.

Alternatively, if a relatively high number of potential patients are located within the second treatment area 50, then further screening of all or many of those potential patients may not be feasible. In such instance, all of the potential patients, currently located at the second treatment area 50 may be administered essentially the same treatment plan in order to treat, as quickly and efficiently as possible, the potential patients which are currently located within the second treatment area 50.

For any victim/patient in which the self-scanning process indicates that medical countermeasures and/or medical treatment can be delayed for a few days or possibly a few weeks, then such victim/patient may possibly be referred to a remote site scheduling area 52 where each such victim/patient can schedule an appointment(s) to be administered the necessary medical countermeasures and/or medical treatment to that victim(s)/patient(s) over the course of the next few days or next few weeks. Alternatively, such potential patients can be given a telephone number, an address, an e-mail address, etc., to contact in order to arrange/schedule one or more appointments for administering the necessary countermeasures and/or medical treatment to the victim/patient.

During the scan by the radiation detection head 20 of the noninvasive self-testing test device 12 it is initially desirable for the radiation threshold value of each noninvasive self-testing test device 12, to be set slightly on "the low side," e.g., the radiation threshold value may initially be set at less than 2.0 Gy at possibly 1.8 Gy, for example, so that initially the self-testing of at least the first substrate 8 of the designated cards 2 of the potential patients will generally be over inclusive. That is, it is typically better for the self-testing testing to refer any victim/patient who may marginally have been exposed to a clinically sufficient dose of ionizing radiation to the second treatment area 50, in order to commence administration of appropriate medical countermeasures and/or medical treatment, rather than to delay such medical countermeasures and/or medical treatment for such marginally exposed victim(s)/patient(s).

It should be appreciated that the radiation detection head 20 may be one or several of the following measurement devices: (1) an electron spin resonance spectrometer, (2) an optical spectrometer, (3) a MOSFET-based electronic dosimeter, or (4) any other device conventionally understood to be useful for the measurement of ionizing radiation.

It is to be appreciated that the noninvasive self-testing test devices 12, incorporated into a kiosk 14, can be located at various public locations throughout the country, e.g., they can be permanent, stand-alone units which are distributed throughout a city, region, county, state or country. These noninvasive self-testing test devices 12 will provide a number of potential patients with the ability to check periodically their exposure to radiation during the course of the year(s). For example, many potential patients may live next to a nuclear power plant and other facilities which emit some radiation and these noninvasive self-testing test devices 12 will allow such victim/patient potential patients to check and monitor periodically their continued exposure to radiation.

By way of example, the currently rank and city population, for the largest cities in the United States is as follows: 1. New York, N.Y., 8,143,197 people, 2. Los Angeles, Calif. 3,844,829 people, 3. Chicago, Ill. 2,842,518 people, 4. Houston, Tex. 2,016,582 people, 5. Philadelphia, Pa. 1,463,281 people, 6. Phoenix, Ariz. 1,461,575 people, 7. San Antonio, Tex. 1,256,509 people, 8. San Diego, Calif. 1,255,540 people, 9. Dallas, Tex. 1,213,825 people, 10. San Jose, Calif. 912,332 people. The following table shows the number of conventional machines needed depending, on cycle time and population screened.

Machines Needed

| Cycle time | Scans per hour | Scans per 24 hours | Devices for Performing 1,000 Scans per 24 hr | Devices for Performing 10,000 Scans per 24 hr | Devices for Performing 100,000 Scans per 24 hr | Devices for Performing 1,000,000 Scans per 24 hr |
|---|---|---|---|---|---|---|
| 15 sec | 240 | 5,760 | 0.1736 | 1.736 | 17.36 | 173.6 |
| 30 sec | 120 | 2,880 | 0.35 | 3.5 | 35 | 350 |
| 1 min | 60 | 1,440 | 0.7 | 7 | 70 | 700 |
| 2 min | 30 | 720 | 1.4 | 14 | 140 | 1,400 |
| 5 min | 12 | 288 | 3.5 | 35 | 350 | 3,500 |
| 10 min | 6 | 144 | 6.9 | 69 | 690 | 6,900 |
| 15 min | 4 | 96 | 10.4 | 104 | 1,040 | 10,400 |
| 20 min | 3 | 72 | 14 | 140 | 1,400 | 14,000 |

As is apparent from the above table, the present invention is capable of facilitating of self-scanning of many thousands, or hundreds of thousands or millions of people with a minimal amount of associated equipment.

It is to be appreciated that while the above description generally refers to a substrate, is conceivable that a variety of other items or components would be suitable to be scanned by the device according to the present invention. For example a variety of clothing items, such as, buttons, fabrics, clothing linings, foot wear, footwear linings, shoes, etc., may be fabricated from a material or be manufactured to incorporate a suitable substrate which is capable of being activated immediately, when exposed to radiation, and facilitate retaining such radiation so as to form a reliable indicator of the amount of radiation that the victim/patient was exposed.

In addition, it is to be appreciated that a variety of biological samples, such as, a mouth swab, hair, a fingernail, urine, other bodily fluids, as well is a non-biological sample may be utilized in accordance with the present invention.

As alluded to above, it is to be appreciated the present invention is also applicable to identifying victims/patients requiring treating other types of mass disasters, such public health emergencies, or routine health care involving a biological or a chemical incident or some other mass disaster not involving radiation, or used in non-emergency or routine medical care involving self-testing, self-reporting and patient informed decision making.

In the above description and appended drawings, it is to be appreciated that only the terms "consisting of" and "consisting only of" are to be construed in the limitative sense while of all other terms are to be construed as being open-ended and given the broadest possible meaning.

While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. A system for facilitating triage of potential patients within a relatively short period of time by a self-scan performed by each potential victim/patient, the system comprising:

a plurality of noninvasive self-testing test devices located at a plurality of self-testing sites;

each one of the plurality of noninvasive self-testing test devices facilitating self testing of each potential victim/patient; and each of the plurality of noninvasive self-testing test devices generating test results in view of the scan of each potential victim/patient, whereby each potential victim/patient can then be screened and triaged based upon the test results of the scan of each potential victim/patient.

2. A system for facilitating triage of potential patients within a relatively short period of time by scanning of a substrate associated with each patient/victim, the system comprising:

a plurality of noninvasive self-testing test devices located at a plurality of self-testing sites;

each one of the plurality of noninvasive self-testing test devices facilitating self screening of the substrate; and each of the plurality of noninvasive self-testing test devices generating test results in view of the scan of the substrate, whereby each victim/patient can be identified then screened and triaged based upon the test results of the scan of the substrate.

3. The system for facilitating triage of potential patients according to claim 2, wherein the substrate is incorporated into a designated card, and the substrate is capable of retaining and indicating any high-energy exposure of the substrate to radiation.

4. The system for facilitating triage of potential patients according to claim 2, wherein the substrate is incorporated into a designated card which comprises at least one of an identification card, a driver's license, a voter ID card, a bank card, a credit card, a gift card, and a college/student ID card; and wherein the substrate comprises a first material which is capable of retaining and indicating any high energy exposure of the first material to radiation and a second material which is capable of retaining and indicating any low-energy exposure of the second material to radiation.

5. The system for facilitating identification of potential patients according to claim 4, wherein the designated card contains at least one of a magnetic strip, a computer chip, or an information or data storing device that contains desired demographic information concerning the potential victim/patient to whom the designated card was issued, and wherein the first material comprises one of alanine and calcium carbonate, for example and the second material comprises one of seashell and hydroxyapatite, for example.

6. The system for facilitating triage of potential patients according to claim 2, wherein the noninvasive self-testing test device comprises a cardholder which has a loading position, which facilitates loading of the designated card to be self-tested, and a scanning/reading position in which the designated card of the victim/patient to be self-tested, is located for scanning or reading by a radiation detection head contained within the noninvasive self-testing test device; and wherein upon moving the cardholder from the loading position to the scanning/reading position, a reader of the noninvasive self-testing test device reads demographic information of the victim/patient stored on the designated card.

7. The system for facilitating screening and triage of potential patients according to claim 2, wherein a front panel of the noninvasive self-testing test device has a user interface by which the victim/patient can answer one or more questions and authorized reading of all, or only an authorized portion, of the demographic information contained on the designated card; and wherein the noninvasive self-testing test device performs between 1 to 10 readings, within 20 seconds or less, and averages results of each reading in order to provide a reliable indicator of an amount of exposure to radiation detected on the designated card.

8. The system for facilitating triage of potential patients according to claim 2, wherein each of the noninvasive self-testing test devices is at least equipped with a wireless transmitter and a wireless receiver in order to facilitate receiving and transmission of information and commands to and from a central control center, thereby facilitate substantially instantaneous exchange of information and commands, and a central processor of the noninvasive self-testing test device controls operation of the wireless transmitter, the wireless receiver, a user interface and an radiation indicator mechanism.

9. The system for facilitating triage of potential patients according to claim 8, wherein the indicator mechanism comprises a set of lights or readout, for example, if the radiation detection head determines that the substrate was radiated with a radiation dose of equal to or greater than a radiation threshold, a first light is illuminated thereby indicating that immediate medical attention is required by the victim/patient owning the scanned designated card, but if the radiation detection head determines that the substrate was radiated with a radiation dose of less than the radiation threshold, then a second light is illuminated thereby indicating that either delayed, or possibly no, medical countermeasures and/or medical treatment is currently required by the victim/patient owning the scanned designated card.

10. The system for facilitating triage of potential patients according to claim 8, wherein the indicator mechanism comprises a mating punch and die set, and if the radiation detection head determines that the substrate was radiated with a radiation dose of equal to or greater than a radiation threshold, the mating punch and die set is activate to punch the scanned designated card thereby indicating that immediate medical attention is required by the victim/patient owning the scanned designated card, but if the radiation detection head determines that the substrate was radiated with a radiation dose less than the radiation threshold, then the mating punch and die set remains inactivated and does not punch the scanned designated card thereby indicating that either delayed, or possibly no, medical countermeasures and/or medical treatment is currently required by the victim/patient owning the scanned designated card.

11. The system for facilitating triage of potential patients according to claim 2, wherein the system further comprises to a first treatment area where delayed medical countermeasures and/or delayed medical treatment can be at least one of administered or scheduled for victim/patient, and a second treatment area where at least one of further screening of the patients and administering of treating drug(s) or medication(s) can be administered to the victim/patient.

12. The system for facilitating triage of potential patients according to claim 11, wherein the further screening, when necessary, of the patients comprises at least one of a blood test, a urine test, a mouth swab, testing or screening of a fingernail of the victim/patient, testing or screening of tooth enamel of the victim/patient and testing or screening of a bodily fluid in order to determine an extent of the radiation, chemical, or biological exposure by that victim patient so that suitable treatment plan can be initiated.

13. The system for facilitating triage of potential patients according to claim 6, wherein the radiation detection head comprises one of: (1) an electron spin resonance spectrometer, (2) an optical spectrometer, (3) a MOSFET-based electronic dosimeter, and (4) or other device able to measure ionizing radiation.

14. The system for facilitating triage of potential patients according to claim 2, wherein each of the plurality of self-testing sites comprises:

the plurality of noninvasive self-testing test devices which facilitate self screening;

a first treatment area where delayed medical countermeasures or delayed medical treatment can be at least one of administered or scheduled for victim/patient; and a second treatment area where at least one of further screening of the patients and administering of treating drug(s) or medication(s) can be administered to the victim/patient.

15. The system for facilitating triage of potential patients according to claim 14, wherein the system further comprises a third treatment area where alternative medical treatment can be administered for any victim/patient who conceivably received a lethal dose of radiation.

16. A method of facilitating triaging of thousands of potential patients within a relatively short period of time by scanning of a substrate of a designated card issued to a victim/patient, the method comprising the steps of:
   issuing a designated card, having a radiation retaining substrate, to a plurality of potential patients;
   following a mass disaster, providing a plurality of noninvasive self-testing test devices at a plurality of remote self-testing sites;
   permitting the plurality of potential patients to self-screen, via one of the plurality of noninvasive self-testing test devices, the substrate of the designated card;
   indicating the test results of the scan of the substrate of the designated card; and
   triaging the plurality of potential patients based upon the test results of the scan of the substrate of the designated card.

17. The method of facilitating triage of potential patients according to claim 16, further comprising the step of providing each noninvasive self-testing test device with a user interface by which the potential victim/patient may answer one or more questions and authorized reading of all, or only an authorized portion, of the demographic information contained on the designated card; and
   performing, via the noninvasive self-testing test device, between 1 to 10 scans of the designated card, within 20 seconds or less, and averages results of each scan in order to provide a reliable indicator of an amount of exposure to radiation detected on the designated card.

18. The method of facilitating triage of potential patients according to claim 16, further comprising the step of designating a first treatment area where delayed medical countermeasures and/or delayed medical treatment can be at least one of administered or scheduled for victim/patient, and
   designation a second treatment area where at least one of further screening of the patients and administering of treating drug(s) or medication(s) can be administered to the victim/patient.

19. The method of facilitating triage of potential patients according to claim 16, further comprising the step of providing each of the plurality of self-testing sites with:
   a) the plurality of noninvasive self-testing test devices which facilitate self screening;
   b) a first treatment area where delayed medical countermeasures or delayed medical treatment can be at least one of administered or scheduled for victim/patient; and
   c) a second treatment area where at least one of further screening of the patients and administering of treating drug(s) or medication(s) can be administered to the victim/patient.

20. The method of facilitating triage of potential patients according to claim 19, further comprising the step of providing each of the plurality of self-testing sites with a third treatment area where alternative medical treatment can be administered for any victim/patient who conceivably received a lethal dose of radiation.

21. The method of facilitating triage of potential patients according to claim 18, further comprising the step, when necessary, of further screening the patients by preforming at least one of:
   a blood test,
   a urine test,
   a mouth swab,
   testing or screening of a fingernail of the victim/patient,
   testing or screening of tooth enamel of the victim/patient, and
   testing or screening of a bodily fluid,
in order to determine an extent of the radiation exposure by that victim/patient so that suitable treatment plan can be initiated.

* * * * *